US012652232B2

(12) United States Patent
Chen

(10) Patent No.: US 12,652,232 B2
(45) Date of Patent: Jun. 9, 2026

(54) PCE FOR BIER-TE PATH

(71) Applicant: Huawei Technologies Co., Ltd.,
Shenzhen (CN)

(72) Inventor: Huaimo Chen, Bolton, MA (US)

(73) Assignee: Huawei Technologies Co., Ltd.,
Shenzhen (CN)

( * ) Notice: Subject to any disclaimer, the term of this
patent is extended or adjusted under 35
U.S.C. 154(b) by 372 days.

(21) Appl. No.: 18/350,593

(22) Filed: Jul. 11, 2023

(65) Prior Publication Data

US 2023/0353484 A1 Nov. 2, 2023

Related U.S. Application Data

(63) Continuation of application No.
PCT/US2022/014217, filed on Jan. 28, 2022.

(60) Provisional application No. 63/143,508, filed on Jan.
29, 2021.

(51) Int. Cl.
H04L 45/16 (2022.01)
H04L 45/50 (2022.01)

(52) U.S. Cl.
CPC .............. H04L 45/16 (2013.01); H04L 45/50
(2013.01)

(58) Field of Classification Search
CPC ......... H04L 45/04; H04L 45/16; H04L 45/42;
H04L 45/50
See application file for complete search history.

(56) References Cited

U.S. PATENT DOCUMENTS

2017/0289028 A1* 10/2017 Ratnasingham ........ H04L 45/50
2018/0287934 A1* 10/2018 Wang ...................... H04L 12/44
2019/0386915 A1* 12/2019 Paul ........................ H04L 45/64
2022/0217086 A1* 7/2022 Dutta ...................... H04L 45/64
2023/0090204 A1* 3/2023 Chen ................... H04L 12/4633
370/392

FOREIGN PATENT DOCUMENTS

EP 3361683 A1 * 8/2018 ........... H04L 45/302

OTHER PUBLICATIONS

Chen, et al., "PCE for BIER-TE Path," draft-chen-pce-bier-te-path-
00, Feb. 21, 2021, 54 pages.
Chen, et al., "PCEP Extensions for BIER-TE," draft-chen-pce-bier-
08, Nov. 24, 2020, 17 pages.

(Continued)

*Primary Examiner* — Donald L Mills
(74) *Attorney, Agent, or Firm* — Conley Rose, P.C.

(57) ABSTRACT

A method is implemented by a first PCE controlling a
BIER-TE domain. The method comprises receiving a first
path computation element protocol (PCEP) message from a
path computation component (PCC) running on each egress
network node, where the first PCEP message contains a
multicast group and a multicast source; obtaining an ingress
node based on the multicast group and the multicast source;
computing a BIER-TE path from the ingress node to each
egress network node; sending a second PCEP message to the
ingress node for the ingress node to create the BIER-TE path
to transport packets for the multicast group and the multicast
source; and receiving a third PCEP message from a PCC
running on the ingress node, where the third PCEP message
includes a status of the BIER-TE path.

20 Claims, 10 Drawing Sheets

1300

Receive a first path computation element protocol (PCEP) message
from a path computation component (PCC) running on each egress
network node, wherein the first PCEP message contains a multicast
group and a multicast source ⟋ 1302

Obtain an ingress node based on the multicast group and the multicast
source ⟋ 1304

Compute a BIER-TE path from the ingress node to each egress
network node ⟋ 1306

Send a second PCEP message to the ingress node for the ingress node
to create the BIER-TE path to transport packets for the multicast group
and the multicast source ⟋ 1308

Receive a third PCEP message from a PCC running on the ingress
node, wherein the third PCEP message includes a status of the BIER-
TE path ⟋ 1310

(56) References Cited

OTHER PUBLICATIONS

Chen, et al., "PCEP Procedures and Protocol Extensions for Using PCE as a Central Controller (PCECC) of BIER," draft-chen-pce-pcep-extension-pce-controller-bier-00, Sep. 25, 2020, 19 pages.

Crabbe, et al., "Path Computation Element Communication Protocol (PCEP) Extensions for Stateful PCE," Sep. 2017, 57 pages.

Dhody, et al., "PCEP Extension for Flow Specification," draft-ietf-pce-pcep-flowspec-12, Oct. 30, 2020, 72 pages.

Eckert, Ed., et al., "Tree Engineering for Bit Index Explicit Replication (BIER-TE)," draft-ietf-bier-te-arch-09, Oct. 30, 2020, 94 pages.

Sivabalan, et al., "Conveying Path Setup Type in PCE Communication Protocol (PCEP) Messages," Jul. 2018, 12 pages.

Wijnands, Ed., et al., "Encapsulation for Bit Index Explicit Replication (BIER) in MPLS and Non-MPLS Networks," Jan. 2018, 24 pages.

Wijnands, Ed., et al., "Multicast Using Bit Index Explicit Replication (BIER)," Nov. 2017, 43 pages.

* cited by examiner

PCE-BIER-TE-Path-Capability sub-TLV

Multicast Traffic Information TLV

IPv4 Multicast Group Address Prefix sub-TLV

IPv6 Multicast Group Address Prefix sub-TLV

600

IPv4 Multicast Source Address Prefix sub-TLV

700

IPv6 Multicast Source Address Prefix sub-TLV

Ingress Node Object for IPv4

Ingress Node Object for IPv6

BIER-TE Path SubObject in ERO

BIER-TE Path SubObject for Path {18', 16', 6', 4', 2', 4, 2}

{18'(8:00000010), 16'(7:10000000), 6'(6:00100000), 4'(6:00001000),
2'(6:00000010), 4(0:00001000), 2(0:00000010)}

BIER-TE Path SubObject in RRO

1300

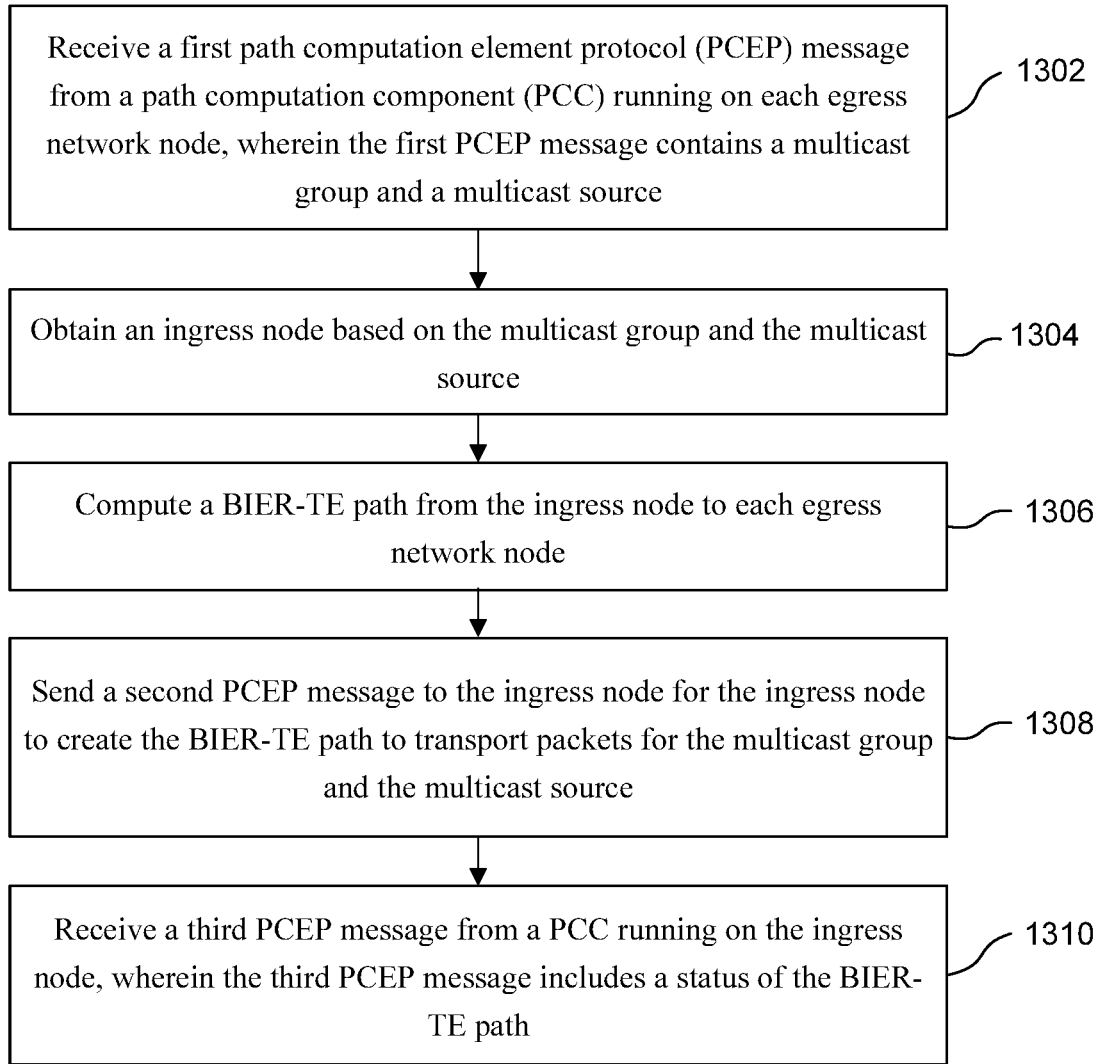

Receive a first path computation element protocol (PCEP) message from a path computation component (PCC) running on each egress network node, wherein the first PCEP message contains a multicast group and a multicast source — 1302

Obtain an ingress node based on the multicast group and the multicast source — 1304

Compute a BIER-TE path from the ingress node to each egress network node — 1306

Send a second PCEP message to the ingress node for the ingress node to create the BIER-TE path to transport packets for the multicast group and the multicast source — 1308

Receive a third PCEP message from a PCC running on the ingress node, wherein the third PCEP message includes a status of the BIER-TE path — 1310

FIG. 13

1400

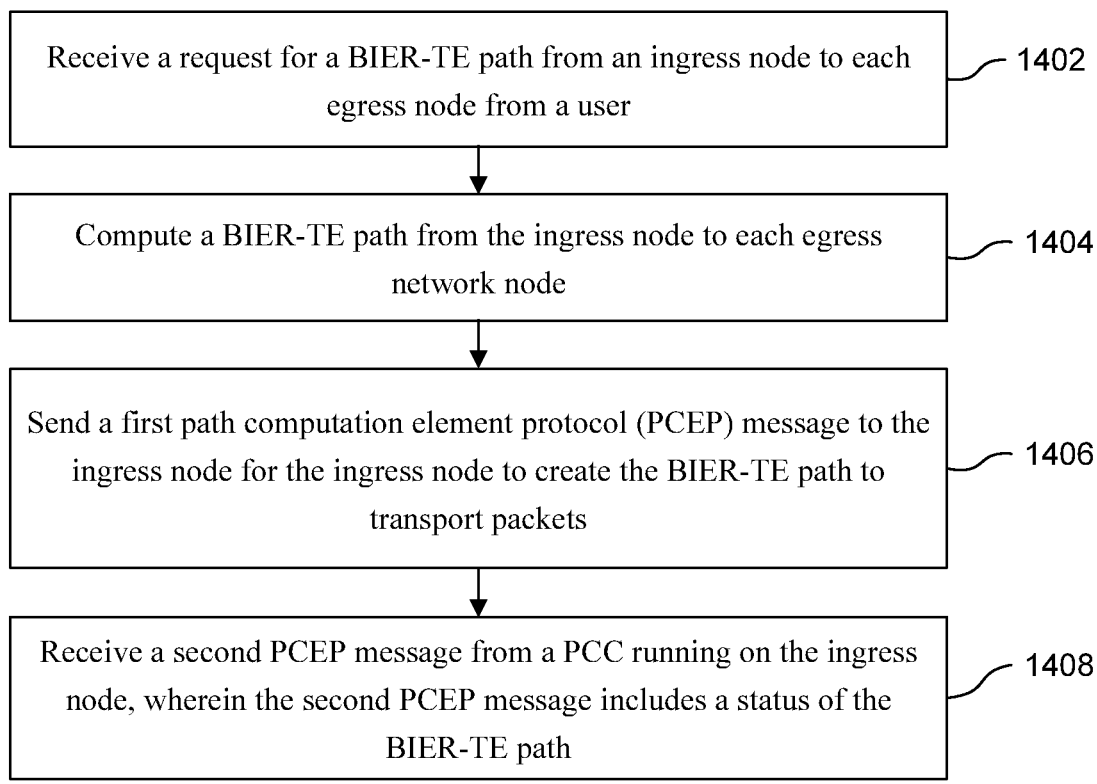

Receive a request for a BIER-TE path from an ingress node to each egress node from a user — 1402

Compute a BIER-TE path from the ingress node to each egress network node — 1404

Send a first path computation element protocol (PCEP) message to the ingress node for the ingress node to create the BIER-TE path to transport packets — 1406

Receive a second PCEP message from a PCC running on the ingress node, wherein the second PCEP message includes a status of the BIER-TE path — 1408

FIG. 14

PCE FOR BIER-TE PATH

CROSS-REFERENCE TO RELATED APPLICATIONS

This is a continuation of Int'l Patent App. No. PCT/US2022/014217 filed Jan. 28, 2022, which claims the benefit of U.S. Prov. Patent App. No. 63/143,508 filed Jan. 29, 2021, which are hereby incorporated by reference.

TECHNICAL FIELD

The present disclosure is generally related to the field of network communication and, in particular, to a path computation element (PCE) for Bit Index Explicit Replication-Traffic/Tree Engineering (BIER-TE).

BACKGROUND

BIER mechanisms provide optimized forwarding of multicast data packets through a BIER domain. BIER domains may not require the use of a protocol for explicitly building multicast distribution trees. Further, BIER domains may not require intermediate nodes to maintain any per-flow state. BIER is described in further detail in Internet Engineering Task Force (IETF) document Request for Comments (RFC) 8279 entitled "Multicast Using Bit Index Explicit Replication (BIER)" by I J. Wijnands, et al., published November 2017.

Traffic Engineering (TE) is the process of steering traffic across to a telecommunications network to facilitate efficient use of available bandwidth between a pair of routers. Bit Index Explicit Replication (BIER) Traffic/Tree Engineering (BIER-TE) is described in IETF document "Tree Engineering for Bit Index Explicit Replication (BIER-TE)" by T. Eckert, et al., published Jul. 9, 2021.

SUMMARY

The disclosed aspects/embodiments provide techniques that allow a path computation element (PCE) to create a Bit Index Explicit Replication Traffic/Tree Engineering (BIER-TE) path through a BIER-TE domain. In order to facilitate the techniques, the present disclosure provides extensions to path computation element protocol (PCEP) objects, which are carried in PCEP messages. The extensions are implemented using type length value (TLV) structures and sub-TLV structures. Using the extensions, packet routing within the BIER-TE domain is improved relative to existing techniques.

A first aspect relates to a method implemented by a first path computation element (PCE) configured to control a Bit Index Explicit Replication Traffic/Tree Engineering (BIER-TE) domain, comprising: receiving a first path computation element protocol (PCEP) message from a path computation component (PCC) running on each egress network node, wherein the first PCEP message contains a multicast group and a multicast source; obtaining an ingress node based on the multicast group and the multicast source; computing a BIER-TE path from the ingress node to each egress network node; sending a second PCEP message to the ingress node for the ingress node to create the BIER-TE path to transport packets for the multicast group and the multicast source; and receiving a third PCEP message from a PCC running on the ingress node, wherein the third PCEP message includes a status of the BIER-TE path.

Optionally, in any of the preceding aspects, another implementation of the aspect provides that the first PCEP message is a path computation label switched path (LSP) state report (PCRpt) message, wherein the PCRpt message indicates that the egress network node joins the multicast group.

Optionally, in any of the preceding aspects, another implementation of the aspect provides that obtaining an ingress node comprises obtaining the ingress node from a table using the multicast group and the multicast source.

Optionally, in any of the preceding aspects, another implementation of the aspect provides that obtaining an ingress node comprises sending a fourth PCEP message to each second PCE for a domain that may contain the multicast source and receiving a fifth PCEP message from the second PCE for the domain with the source, wherein the fifth PCEP message identifies the ingress node when the ingress node is not found in a table.

Optionally, in any of the preceding aspects, another implementation of the aspect provides that the fourth PCEP message is a path computation request (PCReq) message.

Optionally, in any of the preceding aspects, another implementation of the aspect provides that the fifth PCEP message is a path computation reply (PCRep) message.

Optionally, in any of the preceding aspects, another implementation of the aspect provides that the second PCEP message is a path computation LSP initiate request (PCInitiate) message.

Optionally, in any of the preceding aspects, another implementation of the aspect provides that the third PCEP message is a path computation LSP state report (PCRpt) message.

Optionally, in any of the preceding aspects, another implementation of the aspect provides encapsulating the packets with a BIER-TE header, wherein the BIER-TE header includes BitPositions of the BIER-TE path.

Optionally, in any of the preceding aspects, another implementation of the aspect provides recording a status of the BIER-TE path in a memory.

Optionally, in any of the preceding aspects, another implementation of the aspect provides receiving a sixth PCEP message from an egress network node, wherein the sixth PCEP message indicates that the egress network node left the multicast group.

Optionally, in any of the preceding aspects, another implementation of the aspect provides that the first PCE computes a new BIER-TE path and sends the new BIER-TE path to the ingress node in a seventh PCEP message, and wherein the seventh PCEP message is a path computation LSP update request (PCUpd) message.

Optionally, in any of the preceding aspects, another implementation of the aspect provides that the first PCE receives an eighth PCEP message from the ingress node, wherein the eighth PCEP message is a PCRpt message and indicates that the new BIER-TE path has been created, and wherein the first PCE records a status of the new BIER-TE path in the memory.

A second aspect relates to a method implemented by a first path computation element (PCE) configured to control a Bit Index Explicit Replication Traffic/Tree Engineering (BIER-TE) domain, comprising: receiving a request for a BIER-TE path from an ingress node to each egress node from a user; computing the BIER-TE path from the ingress node to each egress network node; sending a first path computation element protocol (PCEP) message to the ingress node for the ingress node to create the BIER-TE path to transport packets; and receiving a second PCEP message from a path computation component (PCC) running on the ingress node, wherein the second PCEP message includes a status of the BIER-TE path.

Optionally, in any of the preceding aspects, another implementation of the aspect provides that the user is a network administrator or a software application.

Optionally, in any of the preceding aspects, another implementation of the aspect provides that the first PCEP message is a path computation LSP initiate request (PCIni-tiate) message.

Optionally, in any of the preceding aspects, another implementation of the aspect provides that the second PCEP message is a path computation LSP state report (PCRpt) message.

Optionally, in any of the preceding aspects, another implementation of the aspect provides encapsulating the packets with a BIER-TE header, wherein the BIER-TE header includes BitPositions of the BIER-TE path.

Optionally, in any of the preceding aspects, another implementation of the aspect provides recording a status of the BIER-TE path in a memory.

A third aspect relates to a first path computation element (PCE) configured to control a Bit Index Explicit Replication Traffic/Tree Engineering (BIER-TE) domain, comprising: a memory storing instructions; and one or more processors coupled to the memory, the one or more processors config-ured to execute the instructions to cause the first PCE to: receive a first path computation element protocol (PCEP) message from a path computation component (PCC) running on each egress network node, wherein the first PCEP mes-sage contains a multicast group and a multicast source; obtain an ingress node based on the multicast group and the multicast source; compute a BIER-TE path from the ingress node to each egress network node; send a second PCEP message to the ingress node for the ingress node to create the BIER-TE path to transport packets for the multicast group and the multicast source; and receive a third PCEP message from the PCC running on the ingress node, wherein the third PCEP message includes a status of the BIER-TE path.

Optionally, in any of the preceding aspects, another implementation of the aspect provides that the first PCEP message is a path computation LSP state report (PCRpt) message, wherein the PCRpt message indicates that the egress network node joins the multicast group.

Optionally, in any of the preceding aspects, another implementation of the aspect provides that the one or more processors are further configured to obtain the ingress node from a table using the multicast group and the multicast source.

Optionally, in any of the preceding aspects, another implementation of the aspect provides that the one or more processors are further configured to obtain the ingress node by sending a fourth PCEP message to each second PCE for a domain that may contain the multicast source and receiv-ing a fifth PCEP message from the second PCE for the domain with the source, wherein the fifth PCEP message identifies the ingress node when the ingress node is not found in a table.

Optionally, in any of the preceding aspects, another implementation of the aspect provides that the fourth PCEP message is a path computation request (PCReq) message.

Optionally, in any of the preceding aspects, another implementation of the aspect provides that the fifth PCEP message is a path computation reply (PCRep) message.

Optionally, in any of the preceding aspects, another implementation of the aspect provides that the second PCEP message is a path computation LSP initiate request (PCIni-tiate) message.

Optionally, in any of the preceding aspects, another implementation of the aspect provides that the third PCEP message is a path computation LSP state report (PCRpt) message.

Optionally, in any of the preceding aspects, another implementation of the aspect provides encapsulating the packets with a BIER-TE header, wherein the BIER-TE header includes BitPositions of the BIER-TE path.

Optionally, in any of the preceding aspects, another implementation of the aspect provides recording a status of the BIER-TE path in a memory.

Optionally, in any of the preceding aspects, another implementation of the aspect provides receiving a sixth PCEP message from an egress network node, wherein the sixth PCEP message indicates that the egress network node left the multicast group.

Optionally, in any of the preceding aspects, another implementation of the aspect provides that the first PCE computes a new BIER-TE path and sends the new BIER-TE path to the ingress node in a seventh PCEP message, and wherein the seventh PCEP message is a path computation LSP update request (PCUpd) message.

Optionally, in any of the preceding aspects, another implementation of the aspect provides that the first PCE receives an eighth PCEP message from the ingress node, wherein the eighth PCEP message is a PCRpt message and indicates that the new BIER-TE path has been created, and wherein the first PCE records a status of the new BIER-TE path in the memory.

A fourth aspect relates to a non-transitory computer readable medium comprising a computer program product for use by a network controller, the computer program product comprising computer executable instructions stored on the non-transitory computer readable medium that, when executed by one or more processors, cause the network controller to perform any of the disclosed embodiments.

A fifth aspect relates to a first path computation element (PCE) configured to control a Bit Index Explicit Replication Traffic/Tree Engineering (BIER-TE) domain, comprising: means for receiving a first path computation element pro-tocol (PCEP) message from a path computation component (PCC) running on each egress network node, wherein the first PCEP message contains a multicast group and a mul-ticast source; means for obtaining an ingress node based on the multicast group and the multicast source; means for computing a BIER-TE path from the ingress node to each egress network node; means for sending a second PCEP message to the ingress node for the ingress node to create the BIER-TE path to transport packets for the multicast group and the multicast source; and means for receiving a third PCEP message from a PCC running on the ingress node, wherein the third PCEP message includes a status of the BIER-TE path.

A sixth aspect relates to a first path computation element (PCE) configured to control a Bit Index Explicit Replication Traffic/Tree Engineering (BIER-TE) domain, comprising: means for receiving a request for a BIER-TE path from an ingress node to each egress node from a user; means for computing the BIER-TE path from the ingress node to each egress network node; means for sending a first path com-putation element protocol (PCEP) message to the ingress node for the ingress node to create the BIER-TE path to transport packets; and means for receiving a second PCEP message from a path computation component (PCC) running on the ingress node, wherein the second PCEP message includes a status of the BIER-TE path.

For the purpose of clarity, any one of the foregoing embodiments may be combined with any one or more of the other foregoing embodiments to create a new embodiment within the scope of the present disclosure.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

FIG. 13 is a method implemented by a network controller configured to control the BIER-TE domain according to an embodiment of the disclosure.

FIG. 14 is a method implemented by a network controller configured to control the BIER-TE domain according to an embodiment of the disclosure.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Existing techniques used by a network controller (e.g., a path computation element (PCE), etc.) to compute and set up a BIER-TE path (a.k.a., a point to multipoint (P2MP) path, a BIER-TE P2MP path, or variations thereof) have drawbacks. For example, existing solutions are partial and mainly describe the BIER explicit route object (BIER-ERO) sub-object used for BIER-TE P2MP paths, which causes inefficiency and leads to difficulties in computing and setting up paths through the BIER-TE domain.

Disclosed herein are techniques that allow a path computation element (PCE) to create a Bit Index Explicit Replication Traffic/Tree Engineering (BIER-TE) path through a BIER-TE domain. In order to facilitate the techniques, the present disclosure provides extensions to path computation element protocol (PCEP) objects, which are carried in PCEP messages. The extensions are implemented using type length value (TLV) structures and sub-TLV structures. Using the extensions, packet routing within the BIER-TE domain is improved relative to existing techniques.

Figure 1:
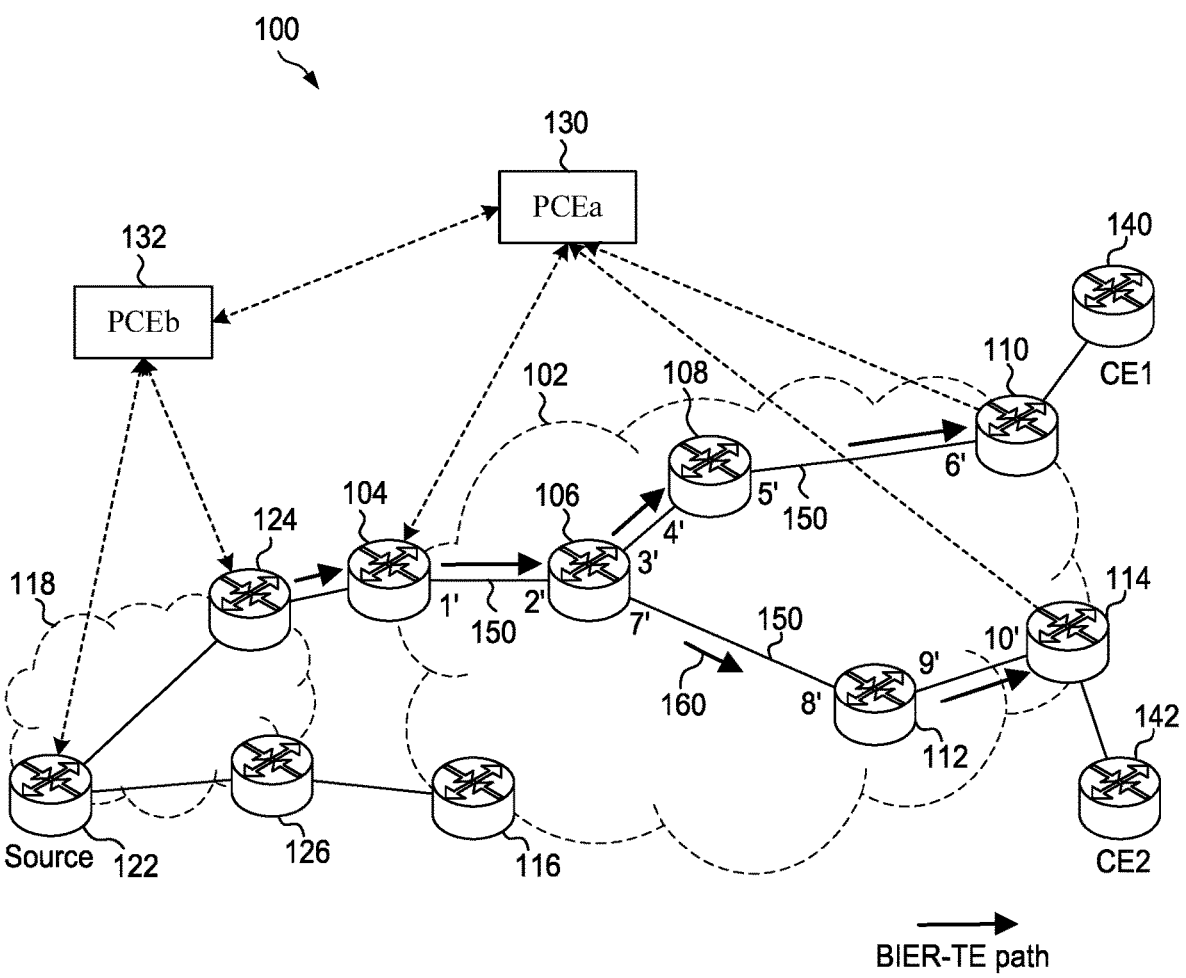
FIG. 1 is a schematic diagram of a BIER-TE topology including a BIER-TE domain.

FIG. 1 is a schematic diagram of a BIER-TE topology 100 including a BIER-TE domain 102. The BIER-TE domain 102 may be part of a larger BIER-TE domain (not shown). As such, the BIER-TE domain 102 may be referred to herein as a BIER-TE sub-domain. The BIER-TE domain 102 comprises a plurality of network nodes 104, 106, 108, 110, 112, 114, and 116. While seven network nodes 104-116 are shown in the BIER-TE domain 102, more or fewer nodes may be included in practical applications.

Each of the network nodes 104-116 is a bit forwarding router (BFR). Some of the network nodes, namely the network nodes 104, 110, 114 and 116, are disposed at an edge of the BIER-TE domain 102. The network nodes 104, 110, 114, and 116 receiving multicast packets from outside the BIER-TE domain 102 may be referred to as an ingress BFR (BFIR). The network nodes 104, 110, 114, and 116 transmitting multicast packets out of the BIER-TE domain 102 may be referred to as an egress BFR (BFER). Depending on the direction of multicast packet traffic, each of the network nodes 104-116 may function as a BFIR or a BFER.

As shown in FIG. 1, the bit position (BP) for forward connected (fw-con) adjacency between the various network nodes 104-116 is identified. In the illustrated example, the BP for a fw-con adjacency is represented as i', where i is an integer corresponding to one of the forward connected adjacencies between the network nodes 104-116 in the BIER-TE domain 102. In the illustrated embodiment of FIG. 1, there are ten total BPs for ten fw-con adjacencies. However, there may be more or fewer BPs for fw-con adjacencies in other BIER-TE domains in practical applications.

As an example of how the BPs for fw-con adjacencies operate with regard to FIG. 1, 2' is the BP for the fw-con adjacency from node 104 to node 106, and 1' is the BP for the fw-con adjacency from node 106 to node 104. 2' is configured on the link from node 104 to node 106 and advertised to all the network nodes in the network. 1' is configured on the link from node 106 to node 104 and advertised to all the network nodes in the network. As another example, 4' is the BP for the fw-con adjacency from node 106 to node 108, and 3' is the BP for the fw-con adjacency from node 108 to node 106. 4' is configured on the link from node 106 to node 108 and advertised to all the network nodes in the network. 3' is configured on the link from node 108 to node 106 and advertised to all the network nodes in the network. As another example, 8' is the BP for the fw-con adjacency from node 106 to node 112, and 7' is the BP for the fw-con adjacency from node 112 to node 106. 8' is configured on the link from node 106 to node 112 and advertised to all the network nodes in the network. 7' is configured on the link from node 112 to node 106 and advertised to all the network nodes in the network. The other BPs for fw-con adjacencies may be determined in a similar fashion as represented by the various values for i' on FIG. 1. For ease of discussion, each BP for fw-con adjacency may be simply referred to herein as the BP or the adjacency.

Each of the network nodes 104, 110, 114, and 116 may be referred to herein as a destination network node or egress BFR (BFER). The network nodes 104, 110, 114, and 116 may each be assigned a BP, a set index (SI), and a bitstring. The BP of a BFER is called a local decapsulation (decap) adjacency or local decap BP. In the illustrated example, the BP of a BFER is represented as j, where j is an integer corresponding to one of the local decap adjacencies in the BIER-TE domain 102. In the illustrated embodiment of FIG. 1, there are four local decap adjacencies for four BFERs 104, 110, 114, and 116. As an example, the BPs of BFERs 104, 110, 114, and 116 may be 1, 2, 3, and 4, respectively. For simplicity, these BPs for local decap adjacencies are represented by (SI:BitString), where SI=0 and BitString is of 8 bits. BPs 1, 2, 3, and 4 are collectively represented by 1 (0:00000001), 2 (0:00000010), 3 (0:00000100), and 4 (0:00001000), respectively. The BP of a BFER is advertised by the BFER to all the nodes in the network.

In an embodiment, the BPs for fw-con adjacencies are represented by (SI:BitString), where SI>=6 and BitString is of 8 bits. For example, the BP of 3' has a SI of 6, and has a bitstring of 00000100 (collectively represented by 3' (6:00000100)). Assuming the SI of 6 corresponds to the first set of eight BPs for fw-con adjacencies, the BP of 3' corresponds to the third bit in the bitstring from the right set to one. That is, when the SI is 6, the BP of 1' corresponds to the first bit set to one, the BP of 2' corresponds to the second bit set to one, the BP of 3' corresponds to the third bit set to one, the BP of 4' corresponds to the fourth bit set to one, and the BP of 5' corresponds to the fifth bit set to one, and so on.

Assuming the SI of 7 corresponds to the second set of eight BPs for fw-con adjacencies immediately following the first set of eight BPs for fw-con adjacencies, the BPs of 9' and 10' are collectively represented by 9' (7:00000001) and 10' (7:00000010), respectively. That is, when the SI is 7, the BP of 9' corresponds to the first bit set to one, and the BP of 10' corresponds to the second bit set to one, and so on. That is, the BP is represented by a number that indicates which bit is set in the BitString.

Each of the network nodes 104-116 has one or more neighbor nodes. As used herein, a neighbor node refers to a network node that is only one hop away from the network node. For example, network node 106 has three neighbor nodes in FIG. 1, namely network node 104, network node 108, and network node 112. Indeed, each of network node 104, network node 108, and network node 112 is only one hop away from network node 106.

As shown, the network node 110 is in communication with a first customer edge (CE1) 140 and the network node 114 is in communication with a second customer edge (CE2) 142. As such, packets routed through the BIER-TE domain 102 may eventually be delivered to the CE1 140 and/or the CE2 142 for consumption by a consumer.

The network nodes 104-116 in FIG. 1 are coupled to, and communicate with each other, via links 150. The links 150 may be wired, wireless, or some combination thereof. In an embodiment, each of the links 150 may have a cost. The cost of each of the links 150 may be the same or different, depending on the BIER-TE network and conditions therein.

The BIER domain 102 is controlled by a network controller 130. In an embodiment, the network controller 130 is a path computation element (PCE). A PCE is a system component, application, or network node capable of determining and finding a suitable route for conveying data (e.g., packets) through a network between a source and a destination. In order to control the BIER-TE domain 102, in one embodiment, the network controller 130 is in communication with each of the network nodes therein, namely network nodes 104-116. That is, the network controller 130 is able to exchange messages with the network nodes 104-116. In another embodiment, the network controller 130 is in communication with each of the network edge nodes (i.e., BFIRs or BFERs) therein, namely network nodes 104, 110, 114 and 116. That is, the network controller 130 is able to exchange messages with the network nodes 104, 110, 114 and 116.

The network controller 130 is also able to exchange messages with other network controllers, such as network controller 132. In an embodiment, the network controller 132 is a PCE. The network controller 132 is configured to control domain 118. In an embodiment, domain 118 is also a BIER-TE domain. In order to control the domain 118, the network controller 132 is in communication with each of the network edge nodes therein, namely network nodes 122, 124, and 126. That is, the network controller 132 is able to exchange messages with the network nodes 122-126.

The domain 118 and the BIER-TE domain 102 are coupled to each other through various network nodes. In the illustrated example, the network node 124 in the domain 118 is in communication with the network node 104 in the BIER-TE domain 102. Likewise, the network node 126 in the domain 118 is in communication with the network node 116 in the BIER-TE domain 102. The nodes within the domain 118 may be connected or coupled together via links similar to the links 150 in the BIER-TE domain 102. In addition, the network nodes 104, 116, 124, and 126 used to couple the domain 118 with the BIER-TE domain 102 may be connected or coupled together via links similar to the links 150 in the BIER-TE domain 102.

In an embodiment, a path computation client (PCC) is running on one or more of the network nodes 104-116 and 122-126. A PCC is a client application or component configured to request that the PCE perform a path computation. For example, the PCC may request that the PCE calculate a BIER-TE path.

In the illustrated embodiment, the network node 122 in domain 118 is a source. The source (e.g., a server, a data center, etc.) is configured to store information or data (e.g., media files, web pages, etc.) and deliver such information or data to the consumer upon request.

Using the BIER-TE topology 100 of FIG. 1, an example of how a network controller such as PCE 130 is able to create a BIER-TE path is provided. In an embodiment, PCE 130 receives a PCEP message from the PCC running on one or more egress network nodes, such as network nodes 110 and 114. In an embodiment, the PCEP message is a path computation label switched path (LSP) state report (PCRpt) message. In an embodiment, the PCRpt message contains a multicast group (e.g., MGa) and a multicast source (e.g., MSa), which reports to the PCE 130 that the network nodes 110, 114 received a multicast join with MGa and MSa. Upon receiving the PCRpt message from the network nodes 110 and 114, the PCE determines that these nodes are the egress nodes of the BIER-TE path since they have the same multicast group and multicast source. Thus, the multicast group includes the network node 110 and the network node 114. Should the network node 110 or 114 leave the multicast group, the PCC running on the network node 110 or 114 would send a multicast leave message to the PCE 130.

Next, the PCE 130 finds an ingress node for the BIER-TE path having network nodes 110 and 114 as egress network nodes. In an embodiment, the PCE 130 obtains the ingress node from a table using the multicast group and the multicast source. The table may be stored in the memory of the PCE 130 or stored on another network device in communication with the PCE 130.

In an embodiment, when the ingress node is not found in the table, the PCE 130 finds the ingress node by sending a PCEP message to each of the domains that may contain the multicast source. That is, the PCE 130 sends the PCEP message to the network controller configured to control each domain. For example, the PCE 130 sends a path computation request (PCReq) message to PCE 132, which is configured to control domain 118. In the illustrated embodiment, domain 118 is the domain that contains the multicast source, namely source 122.

The PCReq message requests that PCE 132 find an ingress node for the BIER-TE path having network nodes 110 and 114 as egress network nodes. The PCReq message contains multicast group (e.g., MGa) and the multicast source (e.g., MSa).

After receiving the PCReq message, the PCE 132 determines which ingress node is reachable from the source 122 with the minimum cost. For example, if the aggregate cost of the links between the source 122 and network node 104 is less than the aggregate cost of the links between the source 122 and the network node 116, the PCE 132 calculates that the network node 104 is the ingress network node.

In an embodiment, PCEs configured to control domains without the source send the PCE 130 a PCRep message indicating that no ingress network node was found within their respective domain.

Once the ingress network node has been calculated, the PCE 132 sends the PCE 130 a PCEP message to identify the ingress network node as network node 104. In an embodiment, the PCEP message is a path computation reply (PCRep) message. Upon receiving the PCRep message identifying network node 104 as the ingress network node, the PCE 130 for the BIER-TE domain 102 computes a BIER-TE path from the ingress network node (e.g., network node 104) to the egress network nodes (e.g., network nodes 110 and 114). As used herein, the BIER-TE path may also be referred to as a point-to-multipoint (P2MP) path or simply a path.

In an embodiment, the BIER-TE path computed by the PCE 130 has the optimal BitPositions and satisfies any desired constraints. The optimal BitPositions means the BitPosition for the BIER-TE path has the minimum number of bit sets and the minimum bit distance.

After the BIER-TE path (shown in bold arrows on FIG. 1) has been determined, the PCE 130 sends a PCEP message to the PCC on ingress network node, which is network node 104. In an embodiment, the PCEP message is a path computation LSP initiate (PCInitiate) message. The PCInitiate message instructs the network node 104 to create the BIER-TE path that was calculated by the PCE 130 in order to transport packets for the given multicast group and multicast source.

Upon receiving the PCInitiate message, the PCC running on the network node 104 creates the BIER-TE path. That is, the PCC running on the network node 104 generates a forwarding entry that imports the packets with the multicast group/address and source into the BIER-TE path. In an embodiment, the PCC running on the network node 104 encapsulates packets with a BIER-TE header having the BitPositions of the BIER-TE path.

Once the BIER-TE path has been created, the PCC running on the network node 104 sends a PCEP message to the PCE 130 to report the creation and/or status of the BIER-TE path. In an embodiment, the PCEP message is a PCRpt message. In an embodiment, the PCE 130 records or stores the creation and/or status of the BIER-TE path in a memory.

Using the BIER-TE topology 100 of FIG. 1, an example of how a BIER-TE path would be updated when existing egress network nodes leave the multicast group is provided. In an embodiment, the PCE 130 receives a PCEP message such as a PCRpt indicating that a network node has left the multicast group. Thereafter, the PCE 130 computes a new BIER-TE path (as generally described above) and sends the new path to the ingress network node in a PCEP message such as a path computation LSP update request (PCUpd) message. The ingress network node replaces the prior BIER-TE path with the new BIER-TE path and notifies the PCE 130 of such action via a PCRpt message. In an embodiment, the PCE 130 records or stores the creation and/or status of the new BIER-TE path in a memory upon receipt of the PCRpt message.

Using the BIER-TE topology 100 of FIG. 1, another example of how a network controller such as PCE 130 is able to create a BIER-TE path is provided. In an embodiment, PCE 130 receives a request for a BIER-TE path from an ingress network node to the egress network nodes from a user. In an embodiment, the user may be a network administrator using, for example, an interface or a graphic user interface to request the path. In an embodiment, the user may be a software application operating on the PCE 130.

Upon receiving the request, the PCE 130 for the BIER-TE domain 102 computes a BIER-TE path from the ingress network node (e.g., network node 104) to the egress network nodes (e.g., network nodes 110 and 114). In an embodiment, the BIER-TE path computed by the PCE 130 has the optimal BitPositions and satisfies any desired constraints. The optimal BitPositions means the BitPosition for the BIER-TE path has the minimum number of bit sets and/or the minimum bit distance.

After the BIER-TE path (shown in bold arrows on FIG. 1) has been determined, the PCE 130 sends a PCEP message to the PCC on ingress network node, which is network node 104. In an embodiment, the PCEP message is a PCInitiate message. The PCInitiate message instructs the network node 104 to create the BIER-TE path that was calculated by the PCE 130 in order to transport packets from the ingress network node to the egress network nodes.

Upon receiving the PCInitiate message, the PCC running on the network node 104 creates the BIER-TE path. That is, the PCC running on the network node 104 generates a forwarding entry that imports the packets with the multicast group/address and source into the BIER-TE path. In an embodiment, the PCC running on the network node 104 encapsulates packets with a BIER-TE header having the BitPositions of the BIER-TE path.

Once the BIER-TE path has been created, the PCC running on the network node 104 sends a PCEP message to the PCE 130 to report the creation and/or status of the BIER-TE path. In an embodiment, the PCEP message is a PCRpt message. In an embodiment, the PCE 130 records or stores the creation and/or status of the BIER-TE path in a memory.

In order to implement the creation and update of the BIER-TE path as described herein, extensions to PCEP objects, which are carried in the PCEP messages, are provided.

During a PCEP session establishment, PCEP speakers (e.g., the PCE or PCC) indicate their ability to support BIER-TE paths. An OPEN object in an Open message contains a Path-Setup-Type-Capability TLV, which is defined in Internet Engineering Task Force (IETF) document Request for Comments (RFC) 8408 entitled "Conveying Path Setup Type in PCE Communication Protocol (PCEP) Messages" by S. Sivabalan, et al., published July 2018.

Figure 2:
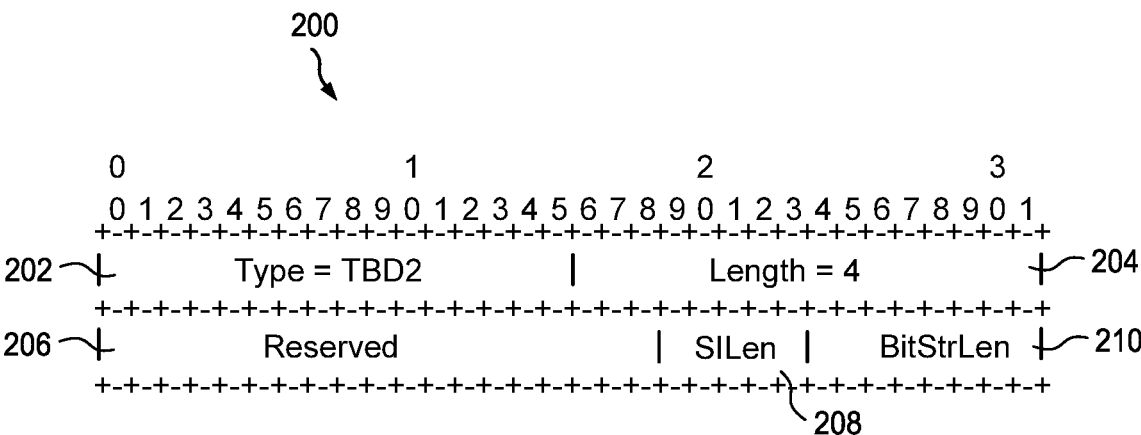
FIG. 2 is a schematic diagram of a PCE-BIER-TE-Path-Capability sub-type length value (sub-TLV) structure according to an embodiment of the disclosure.

The Path-Setup-Type-Capability TLV contains a list of Path Setup Types (PSTs) and optional sub-TLVs associated with the PSTs. The sub-TLVs convey the parameters that are associated with the PSTs supported by a PCEP speaker. The present disclosure defines a new PST value, namely PST=TBD1: path is set up using BIER-TE. A new sub-TLV associated with the new PST value is defined herein, namely the PCE-BIER-TE-Path-Capability sub-TLV 200 depicted in FIG. 2. As shown, the PCE-BIER-TE-Path-Capability sub-TLV 200 includes a type field 202, a length field 204, a reserved field 206, a set index (SI) length field 208, and a bitstring length filed 210. As used herein, a TLV may also be referred to as a TLV structure.

The type field 202 is 16 bits and the value in the type field 202 is to be assigned by the Internet Assigned Numbers Authority (IANA). The length field 204 is 16 bits. In an embodiment, the value in the length field 204 is 4 to indicate that 4 bytes is the total length of the remainder of the sub-TLV, excluding the type and length fields 202, 204. The reserved field 206 is 19 bits. In an embodiment, the reserved field is set to zero by the sender of the PCE-BIER-TE-Path-Capability sub-TLV 200 and ignored by the receiver of the PCE-BIER-TE-Path-Capability sub-TLV 200.

The SI length field 208 is 5 bits and includes a value that indicates a length of the SI field. The bitstring length field 210 is 8 bits and indicates a length in bits of the BitString field according to IETF document RFC 8296 entitled "Encapsulation for Bit Index Explicit Replication (BIER) in MPLS and Non-MPLS Networks" by I J. Wijnands, et al., published January 2018. A PCEP speaker supporting BIER-TE paths includes the new PST and PCE-BIER-TE-Path-Capability sub-TLV 200 in the Path-Setup-Type-Capability TLV.

In an embodiment, if k is the length of the BitString, the value of BitStrLen is log 2(k)−5. For example, BitStrLen having a value of 1 indicates that k=64. As another example, BitStrLen having a value of 7 indicates that k=4096.

One or more PCEP messages described herein (e.g., the PCInitiate message) may include a Stateful PCE Request Parameters (SRP) object. When a PCEP message is used for a BIER-TE path, the SRP object in the message includes the Path-Setup-Type TLV defined in RFC 8408. The TLV contains the PST=TBD1 for path setup using BIER-TE.

Three contiguous bits in an SRP Object Flag Field are defined to indicate one of the assistant operations for a BIER-TE path. This three bits field is called Assistant Operations (AOP). In addition, the Multicast Flow Specification TLV defined in the IETF document entitled "PCEP Extension for Flow Specification" by D. Dhody, et al., published Oct. 14, 2021, is re-used in the SRP object for indicating Multicast Traffic. In an embodiment, the three bits for AOP are bits 27 to 29 (the exact bits to be assigned by IANA) in the SRP Object Flag Field. The values of AOP are defined as follows:

| AOP Value | Meaning (Assistant Operation) |
| --- | --- |
| 0x001 (J) | Join with Multicast Group and Source |
| 0x010 (L) | Leave from Multicast Group and Source |
| 0x011 (I) | Ingress node computation |

The value of AOP indicates one of the three operations above. When any of the other values is received, an error is reported. When the PCC running on an edge node of a BIER-TE domain sends the PCE for the domain a PCEP message such as PCRpt to report that the edge node receives a multicast join, the message includes an SRP object with AOP==0x001 (J).

When the PCC running on an edge node of a BIER-TE domain sends the PCE for the domain a PCEP message such as PCRpt to report that the edge node receives a multicast leave, the message includes an SRP object with AOP==0x010 (L).

When the PCE for the domain sends a PCEP message such as PCReq to another PCE for requesting to find an ingress node for a BIER-TE path, the message includes an SRP object with AOP==0x011 (I).

Figure 3:
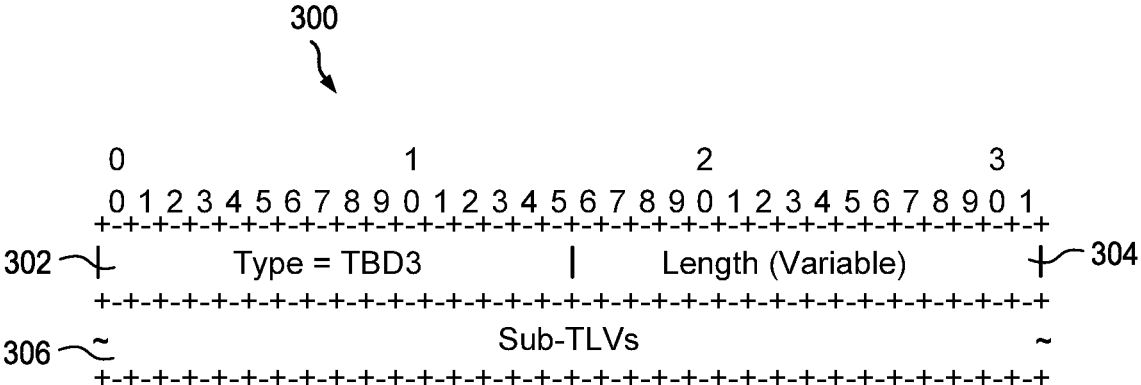
FIG. 3 is a schematic diagram of a Multicast Traffic Information TLV structure according to an embodiment of the disclosure.

For a PCE-Initiated BIER-TE path, when the PCE 130 sends a PCC a PCEP message such as the PCInitiate message to create a BIER-TE path in a BIER-TE domain 102, the message contains a Multicast Traffic Specification TLV or say Multicast Flow Specification TLV 300 as depicted in FIG. 3 in the SRP object. The Multicast Flow Specification TLV 300 indicates the multicast traffic that the BIER-TE path will carry.

When the PCC running on an edge node (e.g., network node 110) of the BIER-TE domain 102 sends the PCE 130 for the BIER-TE domain 130 a PCEP message to report that the edge node receives a multicast join or leave with a multicast group/address and source, the message contains the Multicast Flow Specification TLV 300 in the SRP object. The TLV indicates the multicast group by the multicast group address and/or multicast source address. When the PCE 130 for the BIER-TE domain 102 sends another PCE such as PCE 132 a PCEP message to request that an ingress node for a BIER-TE path be found, the message contains the Multicast Flow Specification TLV 300 in the SRP object. The Multicast Flow Specification TLV 300 indicates the multicast source.

As shown, the Multicast Flow Specification TLV 300 includes a type field 302, a length field 304, and a sub-TLVs field 306. The type field 302 is 16 bits and is the value of the type field 302 to be assigned by the IANA. The length field 304 is 16 bits. The value of the length field 304 is variable. In an embodiment, the value in the length field 304 is 8 to indicate that 8 bytes is the total length of the remainder of the TLV, excluding the type and length fields 302, 304. The sub-TLVs field 306 contains groups of sub-TLVs for IPv4 or IPv6.

Figure 4:
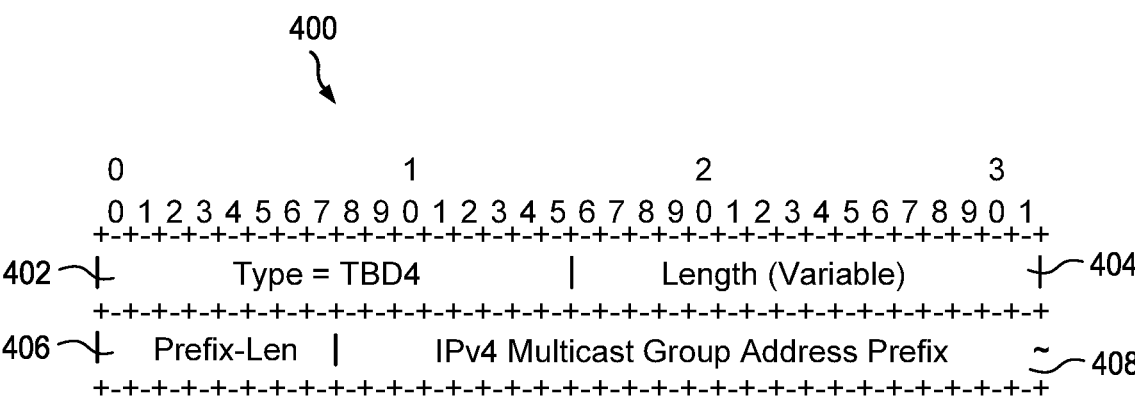
FIG. 4 is a schematic diagram of an Internet Protocol version 4 (IPv4) Multicast Group Address Prefix sub-TLV according to an embodiment of the disclosure.

FIG. 4 is a schematic diagram of an Internet Protocol version 4 (IPv4) Multicast Group Address Prefix sub-TLV 400 according to an embodiment of the disclosure. The IPv4 Multicast Group Address Prefix sub-TLV 400 may be included in the sub-TLVs field 306 of the Multicast Flow Specification TLV 300.

The IPv4 Multicast Group Address Prefix sub-TLV 400 includes a type field 402, a length field 404, a prefix length field 406, and an IPv4 Multicast Group Address Prefix field 408. The type field 402 is 16 bits and the value of the type field 402 is to be assigned by the IANA. The length field 404 is variable. The prefix length field 406 includes a value that indicates a length of the IPv4 Multicast Group Address Prefix field 408. The Ipv4 Multicast Group Address Prefix field 408 includes an IPv4 address used to identify multicast traffic.

Figure 5:
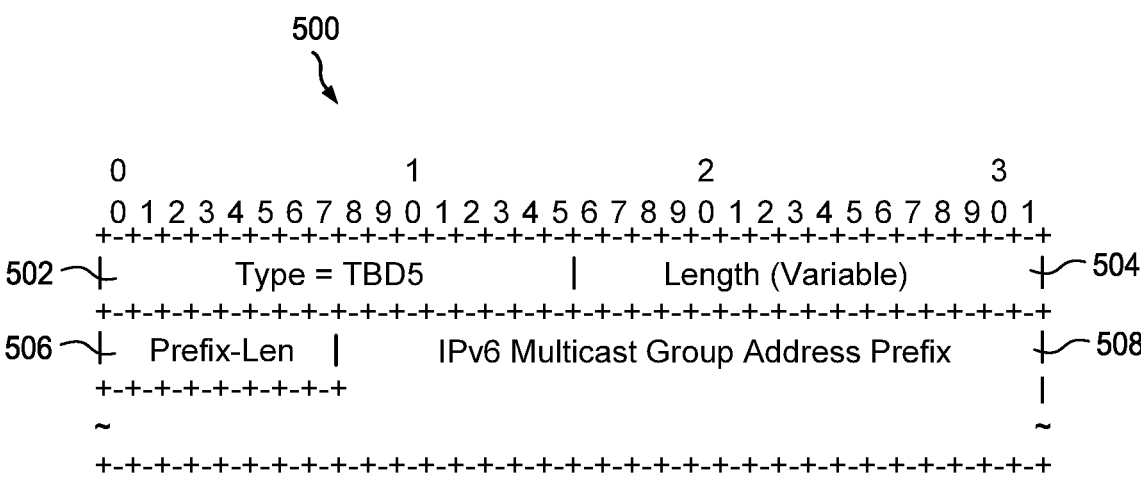
FIG. 5 is a schematic diagram of an Internet Protocol version 6 (IPv6) Multicast Group Address Prefix sub-TLV according to an embodiment of the disclosure.

FIG. 5 is a schematic diagram of an Internet Protocol version 6 (Ipv6) Multicast Group Address Prefix sub-TLV according to an embodiment of the disclosure. The Ipv6 Multicast Group Address Prefix sub-TLV 500 may be included in the sub-TLVs field 306 of the Multicast Flow Specification TLV 300.

The Ipv6 Multicast Group Address Prefix sub-TLV 500 includes a type field 502, a length field 504, a prefix length field 506, and an Ipv6 Multicast Group Address Prefix field 508. The type field 502 is 16 bits and the value of the type field 502 is to be assigned by the IANA. The length field 504 is variable. The prefix length field 506 includes a value that indicates a length of the IPv6 Multicast Group Address Prefix field 508. The IPv6 Multicast Group Address Prefix field 508 includes an IPv6 address used to identify multicast traffic.

Figure 6:
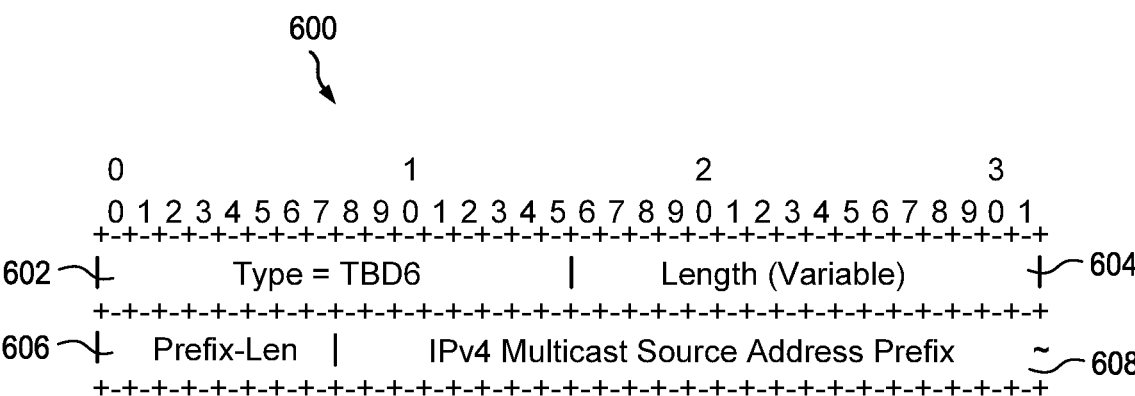
FIG. 6 is a schematic diagram of an IPv4 Multicast Source Address Prefix sub-TLV according to an embodiment of the disclosure.

FIG. 6 is a schematic diagram of an IPv4 Multicast Source Address Prefix sub-TLV 600 according to an embodiment of the disclosure. The IPv4 Multicast Source Address Prefix sub-TLV 600 may be included in the sub-TLVs field 306 of the Multicast Flow Specification TLV 300 along with the IPv4 Multicast Group Address Prefix sub-TLV 400.

The IPv4 Multicast Source Address Prefix sub-TLV 600 includes a type field 602, a length field 604, a prefix length field 606, and an IPv4 Multicast Source Address Prefix field 608. The type field 602 is 16 bits and the value of the type field 602 is to be assigned by the IANA. The length field 604 is variable. The prefix length field 606 includes a value that indicates a length of the IPv4 Multicast Source Address Prefix field 608. The IPv4 Multicast Group Address Prefix field 608 includes an IPv4 address used to identify multicast traffic.

Figure 7:
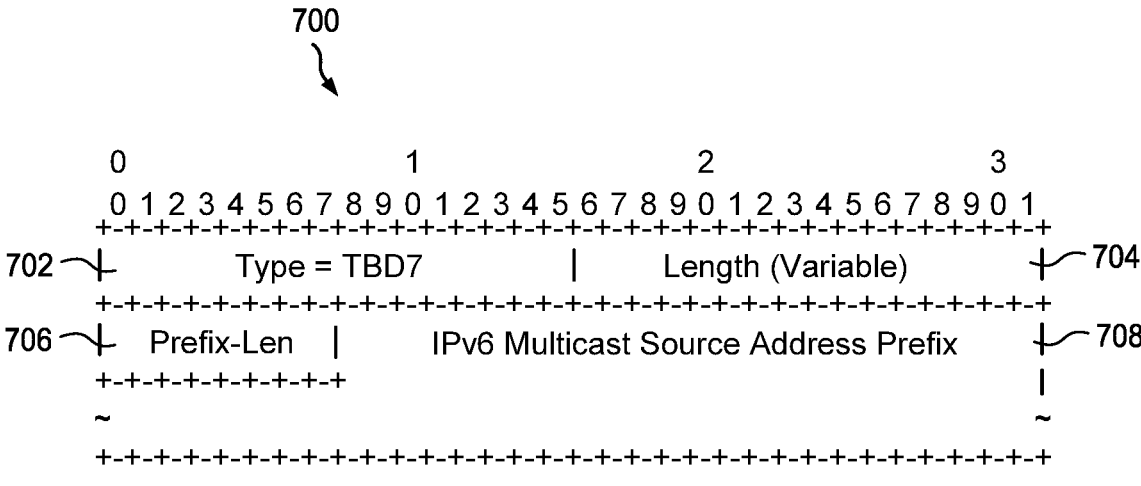
FIG. 7 is a schematic diagram of an IPv6 Multicast Source Address Prefix sub-TLV according to an embodiment of the disclosure.

FIG. 7 is a schematic diagram of an IPv6 Multicast Source Address Prefix sub-TLV 700 according to an embodiment of the disclosure. The IPv6 Multicast Source Address Prefix sub-TLV 600 may be included in the sub-TLVs field 306 of the Multicast Flow Specification TLV 300 along with the IPv6 Multicast Group Address Prefix sub-TLV 500.

The IPv6 Multicast Source Address Prefix sub-TLV 700 includes a type field 702, a length field 704, a prefix length field 706, and an IPv6 Multicast Source Address Prefix field 708. The type field 702 is 16 bits and the value of the type field 702 is to be assigned by the IANA. The length field 704 is variable. The prefix length field 706 includes a value that indicates a length of the IPv6 Multicast Source Address Prefix field 708. The IPv6 Multicast Source Address Prefix field 708 includes an IPv6 address used to identify multicast traffic.

Figure 8:
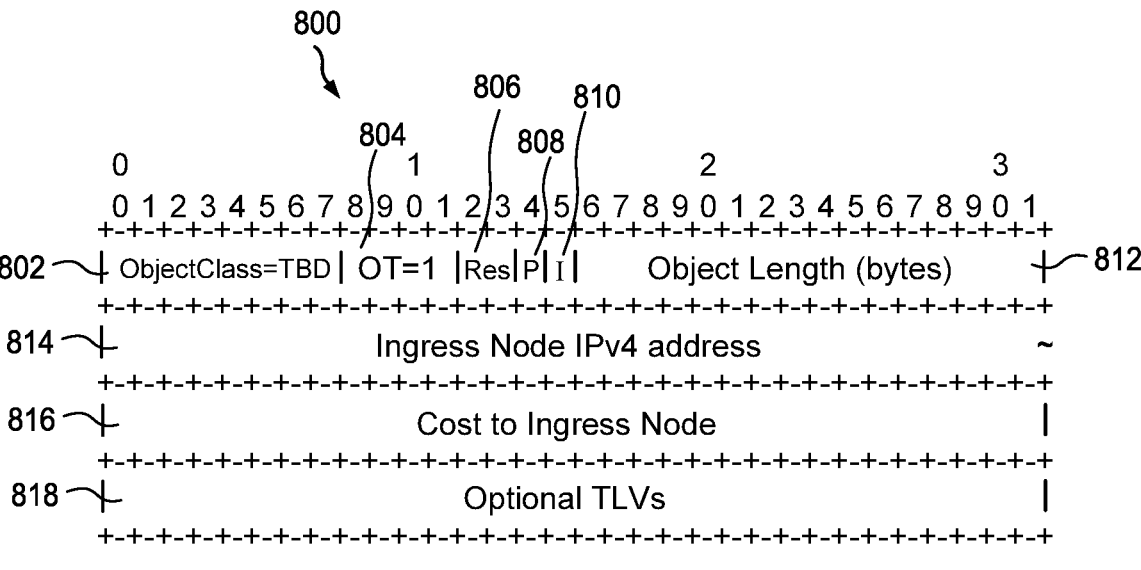
FIG. 8 is a schematic diagram of an Ingress Node Object for IPv4 according to an embodiment of the disclosure.

One or more PCEP messages such as the PCRep message includes an Ingress Node Object for IPv4 800 as depicted in FIG. 8. As shown, the Ingress Node Object for IPv4 800 includes an ObjectClass field 802, an Object Type (OT) field 804, a reserved field 806, a P flag field 808, an I flag field 810, an Object Length field 812, an Ingress Node IPv4 address field 814, a cost to Ingress Node field 816, and an Optional TLVs field 818. The ObjectClass field 802 and the OT field 804 identify an object class and type, respectively. The reserved field 806 is reserved for later use.

The P flag field 808 allows a PCC to specify in a PCReq message sent to a PCE whether the object must be taken into account by the PCE during path computation or is just optional. When the P flag is set, the object is taken into account by the PCE. Conversely, when the P flag is cleared, the object is optional and the PCE is free to ignore it. The I flag field 810 is used by a PCE in a PCRep message to indicate to a PCC whether or not an optional object was processed. The PCE may include the ignored optional object in its reply and set the I flag to indicate that the optional object was ignored during path computation. When the I flag is cleared, the PCE indicates that the optional object was processed during the path computation. The setting of the I flag for optional objects is purely indicative and optional. The I flag has no meaning in a PCRep message when the P flag has been set in the corresponding PCReq message.

The Ingress Node IPv4 address field 814 includes an IPv4 address used to identify an ingress node. The Cost to Ingress Node field 816 includes a value that identifies a cost to the ingress node, and the Optional TLVs field 818 includes any optional TLVs.

Figure 9:
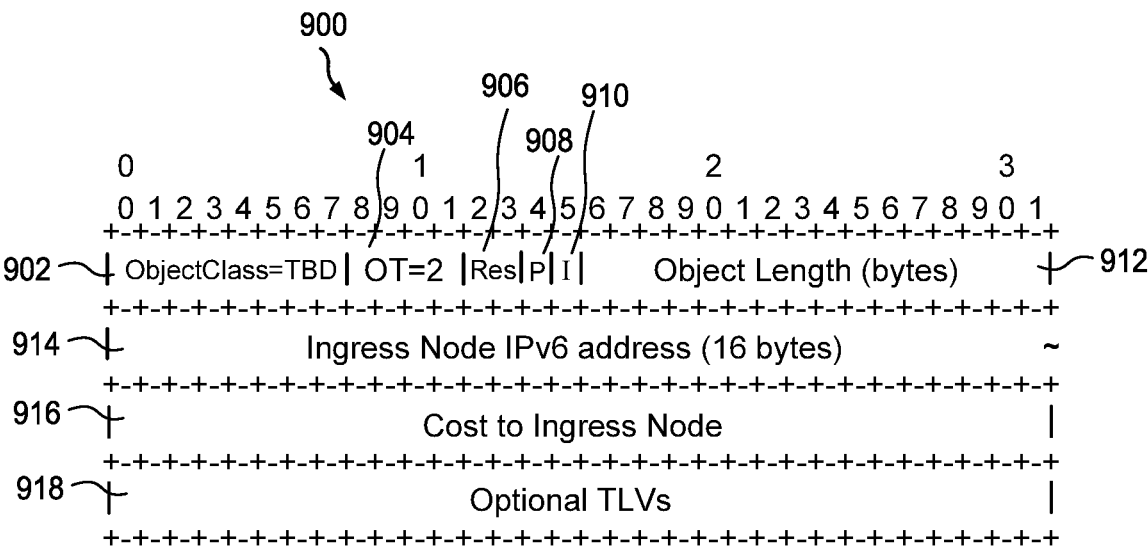
FIG. 9 is a schematic diagram of an Ingress Node Object for IPv6 according to an embodiment of the disclosure.

One or more PCEP messages such as the PCRep message includes an Ingress Node Object for IPv6 900 as depicted in FIG. 9. As shown, the Ingress Node Object for IPv6 900 includes an ObjectClass field 902, an OT field 904, a reserved field 906, a P flag field 908, an I flag field 910, an Object Length field 912, an Ingress Node IPv6 address field 914, a cost to Ingress Node field 916, and an Optional TLVs field 918. The ObjectClass field 902 and the OT field 904 identify an object class and type, respectively. The reserved field 906 is reserved for later use.

The P flag field 908 and the I flag field 908 are similar to the P flag field 808 and the I flag field 808 noted above. The Ingress Node IPv6 address field 914 includes an IPv6 address used to identify an ingress node. The Cost to Ingress Node field 916 includes a value that identifies a cost to the ingress node, and the Optional TLVs field 918 includes any optional TLVs.

One or more PCEP messages such as the PCReq message include a new objective function (OF) for a BIER-TE path. The new OF includes an objective function (OF) code, a name, and a description. In an embodiment, the OF includes an OF code to be assigned by the IANA, a name that is the minimum bit sets (MBS), and a description to find a path represented by BitPositions that have the minimum number of bit sets. In an embodiment, the OF includes an OF code to be assigned by the IANA, a name that is the minimum bits (MB), and a description to find a path represented by BitPositions that have the minimum number of bit distance. The minimum bit distance is the distance from the lowest bit set to one in the BitString to the highest bit set to one in the BitString. For example, the BitString of 10000001 would have the maximum bit distance since the bits set to 1 are the farthest apart from each other as possible in the BitString. As another example, the BitString of 00010001 would have a larger bit distance than the BitString of 00010010 since the bit distance of the BitString of 00010010 is 3 and are closer to each other that the bit distance of the BitString of 00010001 is 4.

One or more PCEP messages (e.g., PCRep, PCInitiate, PCupd) include a new BIER-TE Path SubObject (a.k.a., Subobject, or subobject). The new BIER-TE Path SubObject contains the information about one or more BitPositions.

Figure 10:
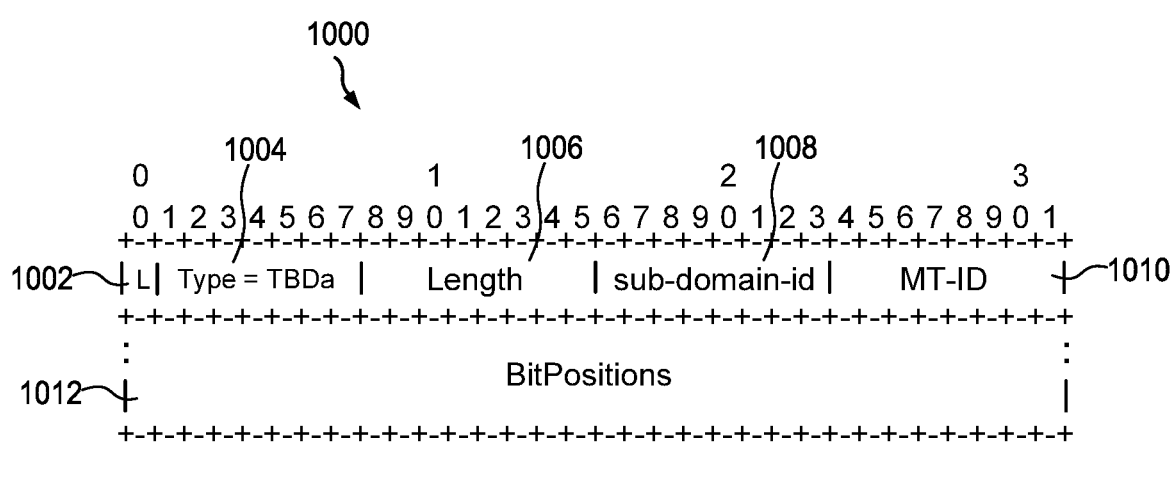
FIG. 10 is a schematic diagram of a BIER-TE Path Subobject in explicit route object (ERO) according to an embodiment of the disclosure.

FIG. 10 is a schematic diagram of a BIER-TE Path Subobject in ERO 1000 according to an embodiment of the disclosure. As shown, the BIER-TE Path Subobject in ERO 1000 includes a loose/strict field 1002, a type field 1004, a length field 1006, a sub-domain identification field 1008, a multi-topology (MT) identification field 1010, and a BitPositions field 1012. The loose/strict field 1002 includes a value to indicate whether or not the next hop is the immediately adjacent neighbor of the network node. Setting the value to 1 indicates loose, which means that the next hop does not need to be the immediately adjacent neighbor of the network node. Setting the value to 0 indicates strict, which means that the next hop is the immediately adjacent neighbor of the network node.

The type field 1004 includes a value assigned by the IANA. The length field 1006 includes a value that indicates a length of the sub-domain identification field 1008, the multi-topology (MT) identification field 1010, and the Bit-Positions field 1012. The sub-domain identification field 1008 includes a value that identifies the sub-domain. The MT identification field 1010 includes a value that identifies the multi-topology. The BitPositions field 1012 includes the BitPositions for the BIER-TE path used to route packets through the BIER-TE domain 102 in FIG. 1.

Figure 11:
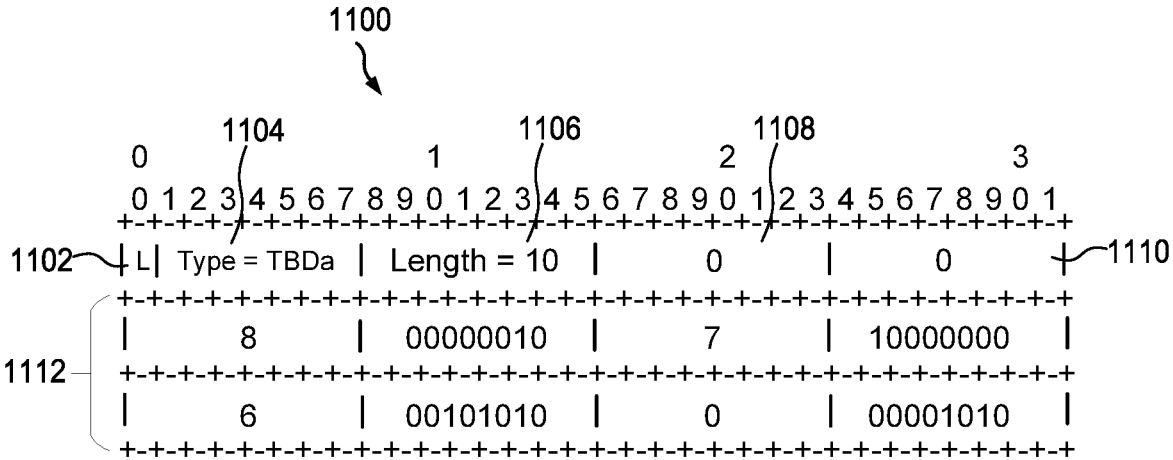
FIG. 11 is a schematic diagram of a BIER-TE Path Subobject for a Path according to an embodiment of the disclosure.

FIG. 11 is a schematic diagram of a BIER-TE Path Subobject for a Path 1100 according to an embodiment of the disclosure. As shown, the BIER-TE Path Subobject for a Path 1100 includes a loose/strict field 1102, a type field 1104, a length field 1106, a sub-domain identification field 1108, an MT identification field 1110, and a BitPositions field 1112.

In FIG. 11, BIER-TE Path Subobject for a Path 1100 represents the Path {18', 16', 6', 4', 2', 4, 2}. To understand how the Path is represented, assume the SI of 6 corresponds to the first set of eight BPs for fw-con adjacencies, the BPs of 1', 2', 3', 4', 5', 6', 7', and 8' would be collectively represented by 1' (6:00000001), 2' (6:00000010), 3' (6:00000100), 4' (6:00001000), 5' (6:00010000), 6' (6:00100000), 7' (6:01000000), and 8' (8:10000000), respectively. That is, when the SI is 6, the BP of 1' corresponds to the first bit set to one, the BP of 2' corresponds to the second bit set to one, the BP of 3' corresponds to the third bit set to one, the BP of 4' corresponds to the fourth bit set to one, and the BP of 5' corresponds to the fifth bit set to one, and so on.

Assuming the SI of 7 corresponds to the second set of eight BPs for fw-con adjacencies immediately following the first set of eight BPs for fw-con adjacencies, the BPs of 9', 10', 11', 12', 13', 14', 15', and 16' would be collectively represented by 9' (7:00000001), 10' (7:00000010), 11' (7:00000100), 12' (7:00001000), 13' (7:00010000), 14' (7:00100000), 15' (7:01000000), and 16' (7:10000000), respectively. That is, when the SI is 7, the BP of 9' corresponds to the first bit set to one, the BP of 10' corresponds to the second bit set to one, the BP of 11' corresponds to the third bit set to one, the BP of 12' corresponds to the fourth bit set to one, the BP of 13' corresponds to the fifth bit set to one, and so on.

Keeping the above in mind, the BitPositions field 1112 in FIG. 11 is populated with several SIs and BitStrings corresponding to the Path {18', 16', 6', 4', 2', 4, 2}. That is, a portion of the BitPositions field 1112 includes the SI of 8 and the BitString of 00000010, which represents the 18' in the Path. Another portion of the BitPositions field 1112 includes the SI of 7 and the BitString of 10000000, which represents the 16' in the Path. A further portion of the BitPositions field 1112 includes the SI of 6 and the BitString of 00101010, which collectively represents the 6', 4', and 2' in the Path. Finally, a portion of the BitPositions field 1112 includes the SI of 0 and the BitString of 00001010, which indicates local decapsulation occurs at network nodes 4 and 2, respectively (e.g., at network nodes 110 and 114).

Figure 12:
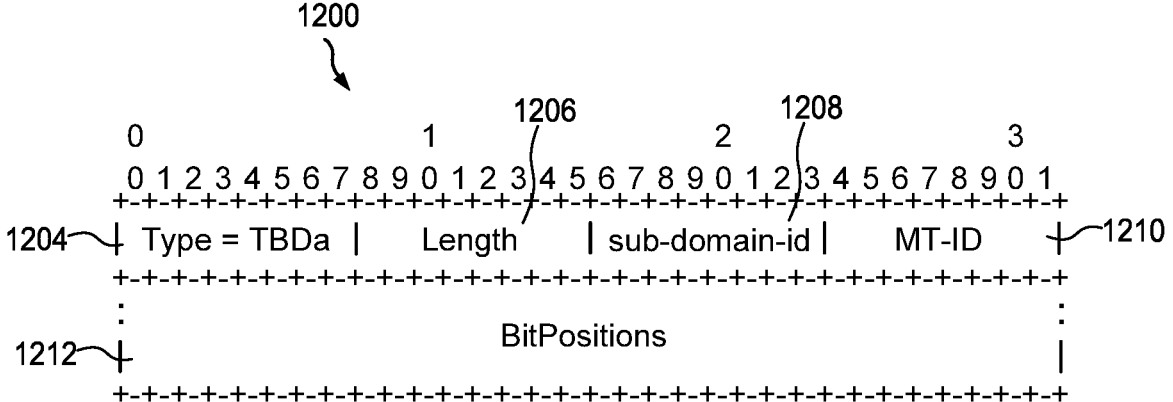
FIG. 12 is a schematic diagram of a BIER-TE Path Subobject in Record Route Object (RRO) according to an embodiment of the disclosure.

FIG. 12 is a schematic diagram of a BIER-TE Path Subobject in Record Route Object (RRO) 1200 according to an embodiment of the disclosure. The BIER-TE Path Subobject in RRO 1200 is similar to the BIER-TE Path Subobject in ERO 1000 in FIG. 10. However, the BIER-TE Path Subobject in RRO 1200 does not include a loose/strict field. As shown, the BIER-TE Path Subobject in RRO 1200 includes a type field 1204, a length field 1206, a sub-domain identification field 1208, an MT identification field 1210, and a BitPositions field 1212.

The type field 1204 includes a value assigned by the IANA. The length field 1206 includes a value that indicates a length of the sub-domain identification field 1208, a multi-topology (MT) identification field 1210, and the Bit-Positions field 1212. The sub-domain identification field 1208 includes a value that identifies the sub-domain. The MT identification field 1210 includes a value that identifies the multi-topology. The BitPositions field 1212 includes the BitPositions for the BIER-TE path used to route packets through the BIER-TE domain 102 in FIG. 1.

To summarize some of the foregoing, every PCEP message for a BIER-TE path includes an SRP containing a Path-Setup-Type TLV with PST=TBD1 for path setup using BIER-TE. The PCRpt includes a BIER-TE path represented by a BIER-TE path subobject or Multicast Traffic TLV in SRP. Flags in the SRP are set for egress join or leave. PCUpd includes a BIER-TE path represented by a BIER-TE path subobject. PCInitiate includes a BIER-TE path represented by a BIER-TE path subobject and a Multicast Traffic TLV in SRP.

PCReq includes a Multicast Traffic TLV in SRP, an OF for BIER-TE path, or Flags in SRP set for computing ingress. PCRep includes a BIER-TE path represented by a BIER-TE path subobject or Ingress nodes represented by ingress node objects.

For a PCC-Initiated BIER-TE path, a PCC delegates the path by sending a PCRpt message with its demanded resources to a stateful PCE. Note the PCC may use the PCReq/PCRep before delegating. Upon receiving the delegation via PCRpt message, the stateful PCE computes a path based on the network resource availability stored in the TED. The stateful PCE will send a PCUpd message for the BIER-TE path to the PCC. The stateful PCE updates its local LSP-DB and TED and would need to synchronize the information with other PCEs in the domain.

For PCE-Initiated BIER-TE path, the stateful PCE computes a BIER-TE path per request from network management systems automatically based on the network resource availability in the TED and send a PCInitiate message with the path information to the PCC.

After receiving the PCInitiate message, the PCC creates the BIER-TE path. For both PCC-Initiated and PCE-Initiated BIER-TE paths: the stateful PCE updates its local LSP-DB and TED with the paths. Upon receiving the PCUpd message or PCInitiate message for the path from PCEs with a found path, the PCC determines that it is a BIER-TE path by the PST=TBD1 for path setup using BIER-TE in the Path-Setup-Type TLV of the SRP object in the message.

In an embodiment, the BIER-TE path update procedures are summarized as follows. After a BIER-TE path is created in a BIER-TE domain, when some network events such as a node failure happen on the path (called old path), the PCE computes a new BIER-TE path and replaces the old path with the new path. The new path has the same ingress node and egress nodes as the old path and satisfies the same constraints as the old path, but the new path may progress through the BIER-TE domain using a different set of network nodes than the old path.

The PCE sends a PCUpd message to the PCC running on the ingress node. The message contains the information about the new BIER-TE path. After receiving the message, the PCC overwrites (or replaces) the BIER-TE path with the new BIER-TE path and sends a report to the PCE.

In an embodiment, the BIER-TE path deletion procedures are summarized as follows. For a BIER-TE path that has been created in a BIER-TE domain, after receiving a request for deleting the path from a user or application, the PCE sends a PCInitiate or PCUpd message with flag for removal to the PCC running on the ingress node of the path to remove the path. After receiving the message, the PCC deletes the BIER-TE path and sends a report to the PCE.

FIG. 13 is a method 1300 implemented by a network controller (e.g., PCE 130) configured to control a BIER-TE domain 102. The method 1300 may be performed by the network controller to establish a BIER-TE path from an ingress node to egress nodes.

In block 1302, the network controller receives a first PCEP message from a PCC running on each egress network node. The first PCEP message contains a multicast group and a multicast source. In an embodiment, the first PCEP message is a PCRpt message, wherein the PCRpt message indicates that the egress network node joins the multicast group.

In block 1304, the network controller obtains an ingress node based on the multicast group and the multicast source. In an embodiment, the ingress node is obtained from a table using the multicast group and the multicast source. In an embodiment, the ingress node is obtained by sending a fourth PCEP message to each second PCE for a domain that may contain the multicast source and receiving a fifth PCEP message from the second PCE for the domain with the source. The fifth PCEP message identifies the ingress node when the ingress node is not found in a table. In an embodiment, the fourth PCEP message is a PCReq message. In an embodiment, the fifth PCEP message is a PCRep message.

In block 1306, the network controller computes a BIER-TE path from the ingress node to each egress network node. In block 1308, the network controller sends a second PCEP message to the ingress node for the ingress node to create the BIER-TE path to transport packets for the multicast group and the multicast source. In an embodiment, the second PCEP message is a PCInitiate message.

In block 1310, the network controller receives a third PCEP message from a PCC running on the ingress node, wherein the third PCEP message includes a status of the BIER-TE path. In an embodiment, the third PCEP message is a PCRpt message.

In an embodiment, the method 1300 further comprises encapsulating the packets with a BIER-TE header, wherein the BIER-TE header includes BitPositions of the BIER-TE path. In an embodiment, the method 1300 further comprises recording a status of the BIER-TE path in a memory. In an embodiment, the method 1300 further comprises receiving a sixth PCEP message from an egress network node, where the sixth PCEP message indicates that the egress network node left the multicast group.

In an embodiment, the first PCE computes a new BIER-TE path and sends the new BIER-TE path to the ingress node in a seventh PCEP message, where the seventh PCEP message is a PCUpd message. In an embodiment, the first PCE receives an eighth PCEP message from the ingress node, where the eighth PCEP message is a PCRpt message and indicates that the new BIER-TE path has been created, and where the first PCE records a status of the new BIER-TE path in the memory.

FIG. 14 is a method 1400 implemented by network element (e.g., PCE 130) configured to control a BIER-TE domain. The method 1400 may be performed by the network controller to establish a BIER-TE path from an ingress node to egress nodes.

In block 1402, the network controller receiving a request for a BIER-TE path from an ingress node to each egress node from a user. In an embodiment, the user is one of a network administrator and a software application. In block 1404, the network controller computes the BIER-TE path from the ingress node to each egress network node.

In block 1406, the network controller sends a first PCEP message to the ingress node for the ingress node to create the BIER-TE path to transport packets. In an embodiment, the first PCEP message is a PCInitiate message.

In block 1408, the network controller receives a second PCEP message from a PCC running on the ingress node, where the second PCEP message includes a status of the BIER-TE path. In an embodiment, the second PCEP message is a PCRpt message.

In an embodiment, the method 1400 further comprises encapsulating the packets with a BIER-TE header, wherein the BIER-TE header includes BitPositions of the BIER-TE path. In an embodiment, the method 1400 further comprises recording a status of the BIER-TE path in a memory.

Figure 15:
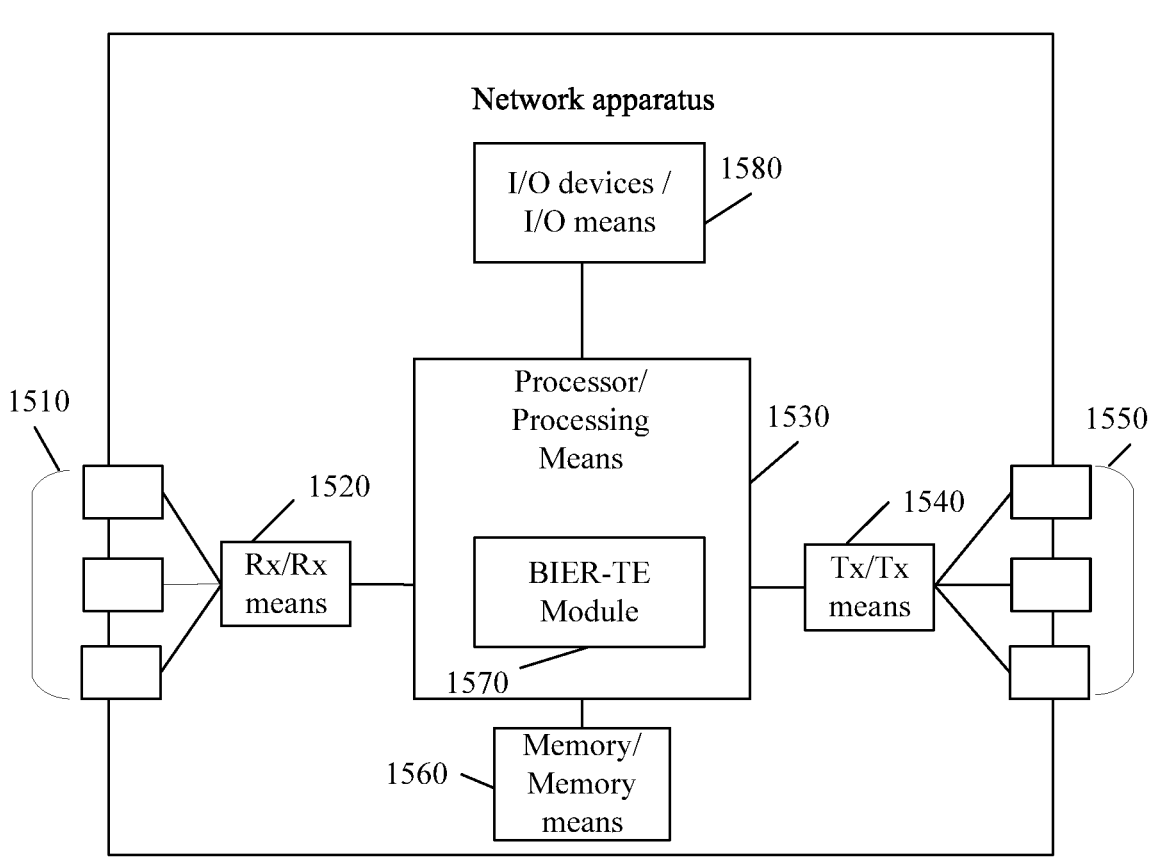
FIG. 15 is a schematic diagram of a network apparatus according to an embodiment of the disclosure.

FIG. 15 is a schematic diagram of a network apparatus 1500 (e.g., a network controller, a network node, etc.). The network apparatus 1500 is suitable for implementing the disclosed embodiments as described herein. The network apparatus 1500 comprises ingress ports/ingress means 1510 (a.k.a., upstream ports) and receiver units (Rx)/receiving means 1520 for receiving data; a processor, logic unit, or central processing unit (CPU)/processing means 1530 to process the data; transmitter units (Tx)/transmitting means 1540 and egress ports/egress means 1550 (a.k.a., downstream ports) for transmitting the data; and a memory/memory means 1560 for storing the data. The network apparatus 1500 may also comprise optical-to-electrical (OE) components and electrical-to-optical (EO) components coupled to the ingress ports/ingress means 1510, the receiver units/receiving means 1520, the transmitter units/transmitting means 1540, and the egress ports/egress means 1550 for egress or ingress of optical or electrical signals.

The processor/processing means 1530 is implemented by hardware and software. The processor/processing means 1530 may be implemented as one or more CPU chips, cores (e.g., as a multi-core processor), field-programmable gate arrays (FPGAs), application specific integrated circuits (ASICs), and digital signal processors (DSPs). The processor/processing means 1530 is in communication with the ingress ports/ingress means 1510, receiver units/receiving means 1520, transmitter units/transmitting means 1540, egress ports/egress means 1550, and memory/memory means 1560. The processor/processing means 1530 comprises a BIER-TE module 1570. The BIER-TE module 1570 is able to implement the methods disclosed herein. The inclusion of the BIER-TE module 1570 therefore provides a substantial improvement to the functionality of the network apparatus 1500 and effects a transformation of the network apparatus 1500 to a different state. Alternatively, the BIER-TE module 1570 is implemented as instructions stored in the memory/memory means 1560 and executed by the processor/processing means 1530.

The network apparatus 1500 may also include input and/or output (I/O) devices or I/O means 1580 for communicating data to and from a user. The I/O devices or I/O means 1580 may include output devices such as a display for displaying video data, speakers for outputting audio data, etc. The I/O devices or I/O means 1580 may also include input devices, such as a keyboard, mouse, trackball, etc., and/or corresponding interfaces for interacting with such output devices.

The memory/memory means 1560 comprises one or more disks, tape drives, and solid-state drives and may be used as an over-flow data storage device, to store programs when such programs are selected for execution, and to store instructions and data that are read during program execution. The memory/memory means 1560 may be volatile and/or non-volatile and may be read-only memory (ROM), random access memory (RAM), ternary content-addressable memory (TCAM), and/or static random-access memory (SRAM).

While several embodiments have been provided in the present disclosure, it may be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, components, techniques, or methods without departing from the scope of the present disclosure. Other examples of changes, substitutions, and alterations are ascertainable by one skilled in the art and may be made without departing from the spirit and scope disclosed herein.

What is claimed is:

1. A method implemented by a first path computation element (PCE) configured to control a Bit Index Explicit Replication Traffic/Tree Engineering (BIER-TE) domain, the method comprising:

receiving a first path computation element protocol (PCEP) message from a path computation component (PCC) running on each egress network node, wherein the first PCEP message contains a multicast group and a multicast source;

obtaining an ingress node based on the multicast group and the multicast source by:

sending a fourth PCEP message to each second PCE for a domain that may contain the multicast source; and receiving a fifth PCEP message from the second PCE, wherein the fifth PCEP message identifies the ingress node;

computing a BIER-TE path from the ingress node to each egress network node;

sending a second PCEP message to the ingress node for the ingress node to create the BIER-TE path to transport packets for the multicast group and the multicast source; and receiving a third PCEP message from a PCC running on the ingress node, wherein the third PCEP message includes a status of the BIER-TE path.

2. The method of claim 1, wherein the first PCEP message is a path computation label switched path (LSP) state report (PCRpt) message, and wherein the PCRpt message indicates that the egress network node joins the multicast group.

3. The method of claim 1, wherein the fourth PCEP message is a path computation request (PCReq) message or the fifth PCEP message is a path computation reply (PCRep) message.

4. The method of claim 1, wherein the second PCEP message is a path computation label switched path (LSP) initiate request (PCInitiate) message and the third PCEP message is a path computation LSP state report (PCRpt) message.

5. The method of claim 1, further comprising encapsulating the packets with a BIER-TE header, wherein the BIER-TE header includes BitPositions of the BIER-TE path.

6. The method of claim 1, further comprising recording the status of the BIER-TE path in a memory.

7. The method of claim 1, further comprising receiving a sixth PCEP message from an egress network node, wherein the sixth PCEP message indicates that the egress network node left the multicast group.

8. The method of claim 7, further comprising:

computing a new BIER-TE path; and sending the new BIER-TE path to the ingress node in a seventh PCEP message, wherein the seventh PCEP message is a path computation label switched path (LSP) update request (PCUpd) message.

9. The method of claim 8, further comprising:

receiving an eighth PCEP message from the ingress node, wherein the eighth PCEP message is a PCRpt message and indicates that the new BIER-TE path has been created; and recording a status of the new BIER-TE path in a memory.

10. A first path computation element (PCE) configured to control a Bit Index Explicit Replication Traffic/Tree Engineering (BIER-TE) domain, the first PCE comprising:

a memory configured to store instructions; and one or more processors coupled to the memory, the one or more processors configured to execute the instructions to cause the first PCE to:

receive a first path computation element protocol (PCEP) message from a path computation component (PCC) running on each egress network node, wherein the first PCEP message contains a multicast group and a multicast source;

obtain an ingress node based on the multicast group and the multicast source by:

sending a fourth PCEP message to each second PCE for a domain that may contain the multicast source; and receiving a fifth PCEP message from the second PCE, wherein the fifth PCEP message identifies the ingress node;

compute a BIER-TE path from the ingress node to each egress network node;

send a second PCEP message to the ingress node for the ingress node to create the BIER-TE path to transport packets for the multicast group and the multicast source; and receive a third PCEP message from a PCC running on the ingress node, wherein the third PCEP message includes a status of the BIER-TE path.

11. The first PCE of claim 10, wherein the first PCEP message is a path computation label switched path (LSP) state report (PCRpt) message, and wherein the PCRpt message indicates that the egress network node joins the multicast group.

12. The first PCE of claim 10, wherein the fourth PCEP message is a path computation request (PCReq) message and the fifth PCEP message is a path computation reply (PCRep) message.

13. The first PCE of claim 10, wherein the second PCEP message is a path computation label switched path (LSP) initiate request (PCInitiate) message and the third PCEP message is a path computation LSP state report (PCRpt) message.

14. The first PCE of claim 10, wherein the one or more processors are further configured to execute the instructions to cause the first PCE to encapsulate the packets with a BIER-TE header, and wherein the BIER-TE header includes BitPositions of the BIER-TE path.

15. The first PCE of claim 10, wherein the one or more processors are further configured to execute the instructions to cause the first PCE to record the status of the BIER-TE path in the memory.

16. The first PCE of claim 10, wherein the one or more processors are further configured to execute the instructions to cause the first PCE to receive a sixth PCEP message from an egress network node, and wherein the sixth PCEP message indicates that the egress network node left the multicast group.

17. The first PCE of claim 16, wherein the one or more processors are further configured to execute the instructions to cause the first PCE to:

compute a new BIER-TE path; and
  send the new BIER-TE path to the ingress node in a seventh PCEP message, wherein the seventh PCEP message is a path computation label switched path (LSP) update request (PCUpd) message.

18. The first PCE of claim 17, wherein the one or more processors are further configured to execute the instructions to cause the first PCE to:

receive an eighth PCEP message from the ingress node, wherein the eighth PCEP message is a PCRpt message and indicates that the new BIER-TE path has been created; and
record a status of the new BIER-TE path in the memory.

19. A non-transitory computer readable medium comprising a computer program product for use by a first path computation element (PCE), the computer program product comprising computer-executable instructions stored on the non-transitory computer readable medium that, when executed by one or more processors, cause the first PCE to:

receive a first path computation element protocol (PCEP) message from a path computation component (PCC) running on each egress network node, wherein the first PCEP message contains a multicast group and a multicast source;
  obtain an ingress node based on the multicast group and the multicast source by:
    sending a fourth PCEP message to each second PCE for a domain that may contain the multicast source; and
    receiving a fifth PCEP message from the second PCE, wherein the fifth PCEP message identifies the ingress node;
  compute a BIER-TE path from the ingress node to each egress network node;
  send a second PCEP message to the ingress node for the ingress node to create the BIER-TE path to transport packets for the multicast group and the multicast source; and
  receive a third PCEP message from a PCC running on the ingress node, wherein the third PCEP message includes a status of the BIER-TE path.

20. The non-transitory computer readable medium of claim 19, wherein the first PCEP message is a path computation label switched path (LSP) state report (PCRpt) message, and wherein the PCRpt message indicates that the egress network node joins the multicast group.

* * * * *